(12) United States Patent
Tikkanen et al.

(10) Patent No.: US 9,349,003 B2
(45) Date of Patent: May 24, 2016

(54) DETECTING APPLICATION BEHAVIOR

(71) Applicant: F-Secure Corporation, Helsinki (FI)

(72) Inventors: Antti Tikkanen, Helsinki (FI); Daavid Hentunen, Espoo (FI)

(73) Assignee: E-Secure Corporation, Helsinki (FI)

( * ) Notice: Subject to any disclaimer, the term of this patent is extended or adjusted under 35 U.S.C. 154(b) by 7 days.

(21) Appl. No.: 14/078,719

(22) Filed: Nov. 13, 2013

(65) Prior Publication Data

US 2014/0143875 A1     May 22, 2014

(30) Foreign Application Priority Data

Nov. 22, 2012 (GB) .................................. 1221006.8

(51) Int. Cl.
*G06F 21/56* (2013.01)
*H04L 29/06* (2006.01)
*G06F 7/04* (2006.01)

(52) U.S. Cl.
CPC .............. *G06F 21/56* (2013.01); *G06F 21/566* (2013.01); *H04L 63/1408* (2013.01)

(58) Field of Classification Search
CPC ....................................................... G06F 21/56
USPC ................................. 726/2, 16, 22, 24, 25, 26
See application file for complete search history.

(56) References Cited

U.S. PATENT DOCUMENTS

| | | | |
|---|---|---|---|
| 8,660,129 B1* | 2/2014 | Brendel | 370/397 |
| 2004/0128552 A1* | 7/2004 | Toomey | G06F 21/57 726/22 |
| 2007/0038719 A1* | 2/2007 | Brown | H04L 63/123 709/207 |
| 2007/0124006 A1* | 5/2007 | Tucker | H04Q 3/0058 700/90 |
| 2008/0046983 A1* | 2/2008 | Lester | G06F 21/31 726/5 |
| 2010/0011029 A1* | 1/2010 | Niemela | 707/200 |
| 2010/0122317 A1* | 5/2010 | Yadav | 726/1 |
| 2010/0125758 A1* | 5/2010 | Yang | G06F 11/362 714/45 |
| 2011/0185423 A1 | 7/2011 | Sallam | 726/23 |
| 2012/0167121 A1* | 6/2012 | Reierson | G06F 9/541 719/328 |
| 2012/0179737 A1* | 7/2012 | Baranov | H04W 76/023 709/201 |
| 2013/0081118 A1* | 3/2013 | Ge | H01L 63/0815 726/6 |
| 2013/0152196 A1* | 6/2013 | Garg | H04L 63/1441 726/22 |
| 2013/0170377 A1* | 7/2013 | Hong | H04L 69/22 370/252 |
| 2013/0305360 A1* | 11/2013 | Yoshioka | H04L 51/12 726/22 |
| 2014/0096198 A1* | 4/2014 | Brunson | H04L 63/0281 726/4 |
| 2014/0245446 A1* | 8/2014 | Shanmugavelayutham et al. | G06F 21/566 726/24 |
| 2014/0259096 A1* | 9/2014 | Biswas | H04W 12/02 726/1 |

OTHER PUBLICATIONS

"WallDroid: Cloud Assisted Virtualized Application Specific Firewalls for the Android OS", Caner Kilinc et al., IEEE 2012, pp. 877-883.
"Carat: Collaborative Energy Diagnosis", www.http://carat.cs.berkeley.edu, 2014, 4 pgs.

* cited by examiner

*Primary Examiner* — Abu Sholeman
(74) *Attorney, Agent, or Firm* — Harrington & Smith

(57) ABSTRACT

There is provided a method including generating, by a security application executed in a processing device, an application list including one or more applications which are currently running in the processing device; identifying at least one network address fulfilling predetermined criteria; determining which of the at least one network address fulfilling the predetermined criteria has been connected to by the processing device within a predefined time period; and providing a post-processing entity with the application list and an indication on which of the at least one network address fulfilling the predetermined criteria has been connected to by the processing device within the predefined time period.

25 Claims, 5 Drawing Sheets

Figure 1:
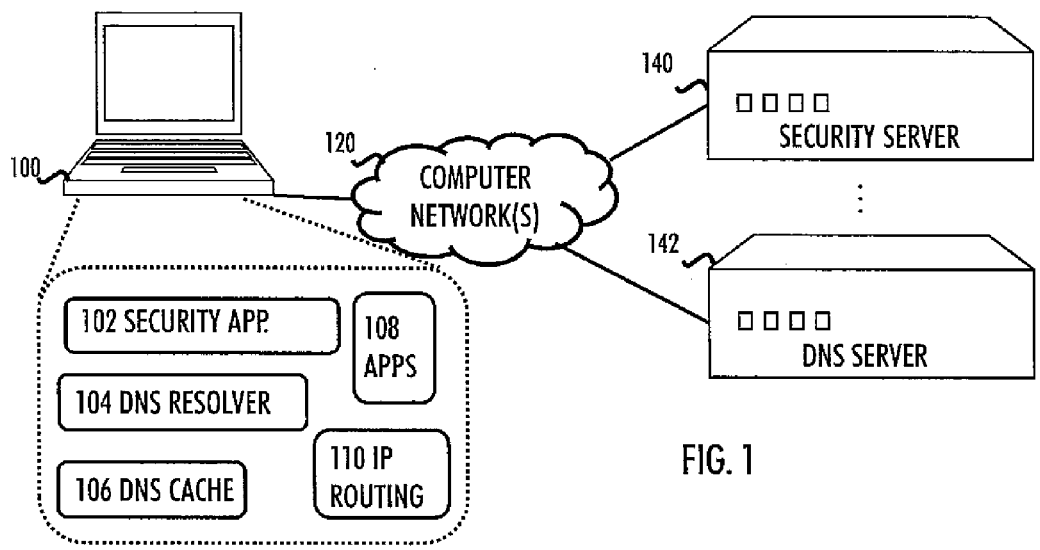

700 RECEIVING, BY A SECURITY APPLICATION EXECUTED IN A POST-PROCESSING ENTITY, A SET OF INFORMATION FROM EACH OF A PLURALITY OF PROCESSING DEVICES, WHEREIN EACH SET OF INFORMATION COMPRISES AT LEAST THE FOLLOWING:
1) AN APPLICATION LIST INCLUDING ONE OR MORE APPLICATIONS WHICH ARE CURRENTLY RUNNING IN THE GIVEN PROCESSING DEVICE, AND
2) AN INDICATION ON WHICH AT LEAST ONE NETWORK ADDRESS FULFILLING PREDETERMINED CRITERIA HAS BEEN RESOLVED WITHIN A PREDEFINED TIME PERIOD BY THE GIVEN PROCESSING DEVICE

702 DETERMINING WHICH OF THE ONE OR MORE APPLICATIONS IN THE APPLICATION LIST HAVE MADE CONNECTIONS TO WHICH OF THE AT LEAST ONE NETWORK ADDRESS FULFILLING THE PREDETERMINED CRITERIA ON THE BASIS OF STATISTICAL ANALYSIS AND THE RECEIVED SETS OF INFORMATION FROM EACH OF THE PLURALITY OF PROCESSING DEVICES

FIG. 7A

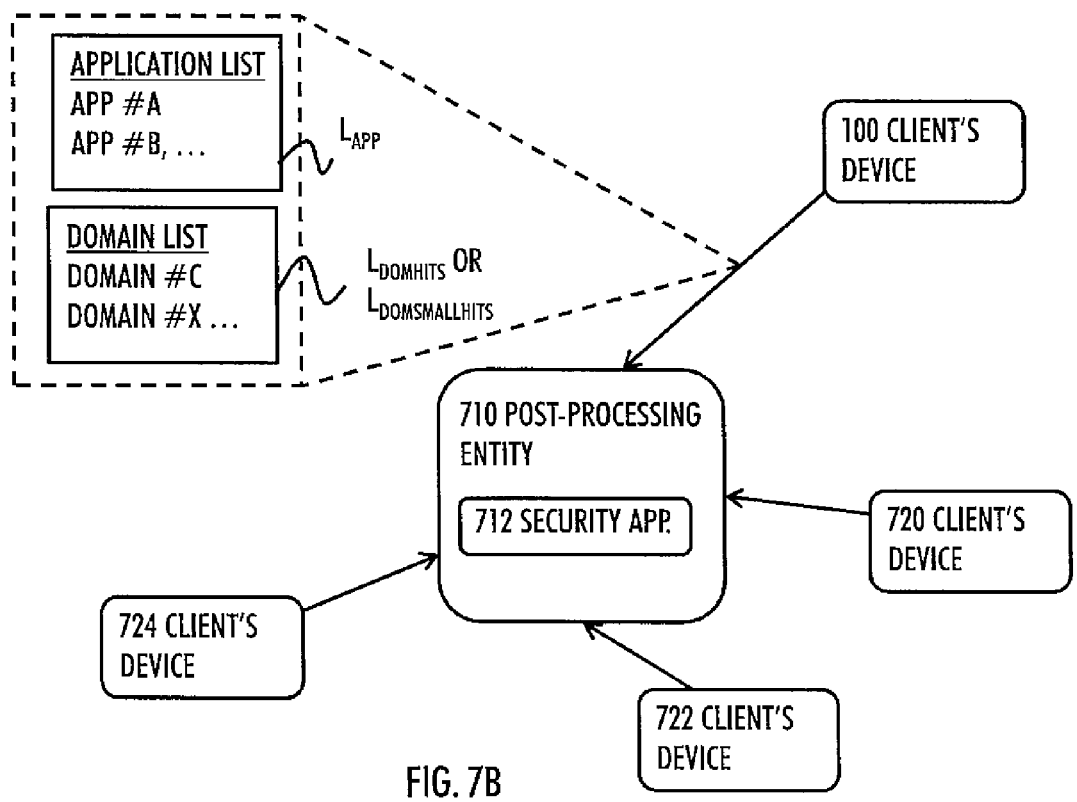

FIG. 7B

DETECTING APPLICATION BEHAVIOR

FIELD

The invention relates generally to detecting application behavior on clients' devices. More particularly, the invention relates to detecting application behavior on restricted platforms.

BACKGROUND

It may be of importance to detect which application is malicious or belongs to a family of malware, for example. It is known to detect and analyze application behavior in a static way, e.g. by analyzing its code and data. However, monitoring their behavior may be more effective. Unfortunately, not all platforms allow such monitoring.

BRIEF DESCRIPTION OF THE INVENTION

According to an aspect of the invention, there are provided methods as specified in claims 1 and 10.

According to an aspect of the invention, there are provided apparatuses as specified in claims 14 and 22.

According to an aspect of the invention, there is provided a computer program product embodied on a distribution medium readable by a computer and comprising program instructions which, when loaded into an apparatus, cause the apparatus at least to: generate an application list including one or more applications which are currently running in the processing device; identify at least one network address fulfilling predetermined criteria; determine which of the at least one network address fulfilling the predetermined criteria has been connected to by the processing device within a predefined time period; provide a post-processing entity with the application list and an indication on which of the at least one network address fulfilling the predetermined criteria has been connected to by the processing device within the predefined time period; receive, from the post-processing entity, a response comprising instructions related to a specific application included in the application list when the post-processing entity has determined that the specific application has connected to the network address fulfilling the predetermined criteria; and perform an action with respect to the application on the basis of the response.

According to an aspect of the invention, there is provided a computer program product embodied on a distribution medium readable by a computer and comprising program instructions which, when loaded into an apparatus, cause the apparatus at least to: receive a set of information from each of a plurality of processing devices, wherein each set of information comprises at least the following: an application list including one or more applications which are currently running in the given processing device, and an indication on which of at least one network address fulfilling predetermined criteria has been connected to within a predefined time period by the given processing device; determine which of the one or more applications in the application list have made connections to which of the at least one network address fulfilling the predetermined criteria on the basis of a statistical analysis and the received sets of information from each of the plurality of processing devices; and respond to each of the plurality of processing devices with instruction relating to a specific application included in the application list when the specific application has been determined to have connected to the network address fulfilling the predetermined criteria, wherein the instructions cause the plurality of processing devices to perform an action with respect to the application on the basis of the response.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

Figure 2:
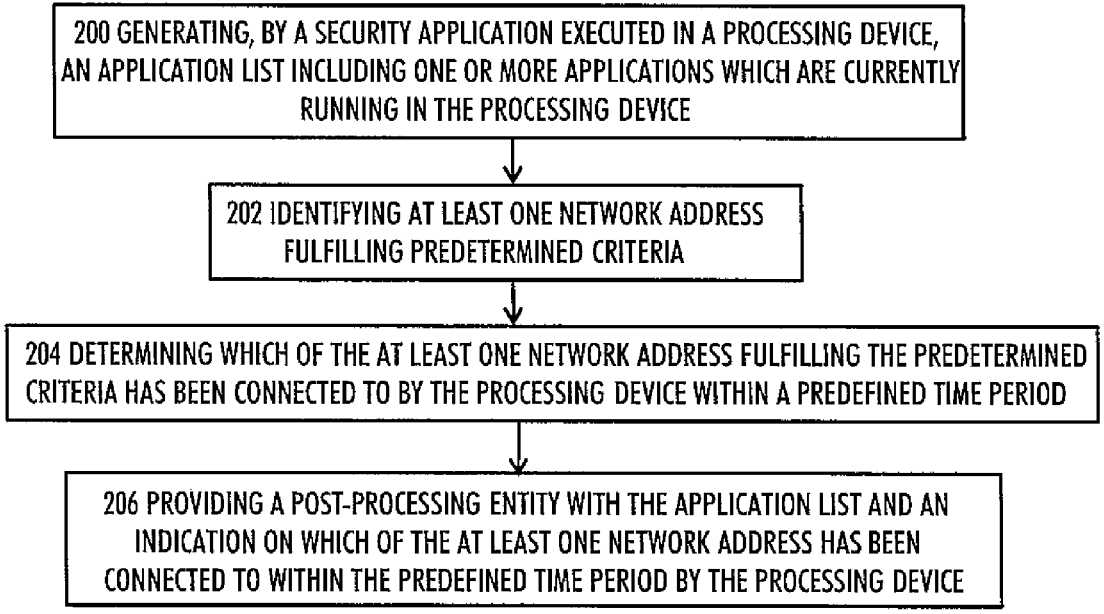
Figure 3:
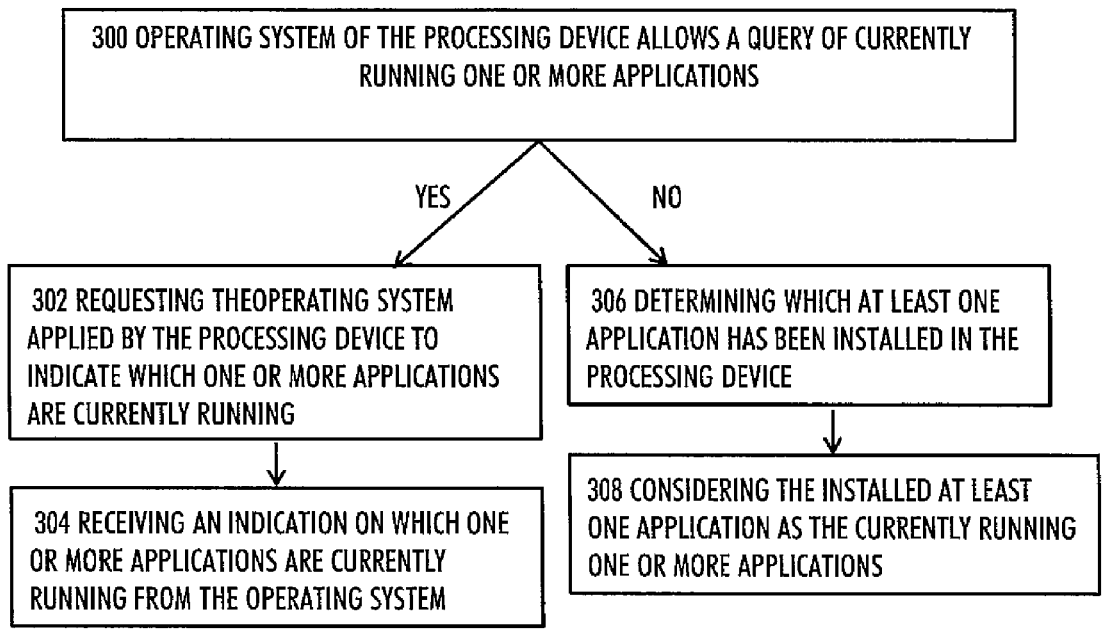
Figure 4A:
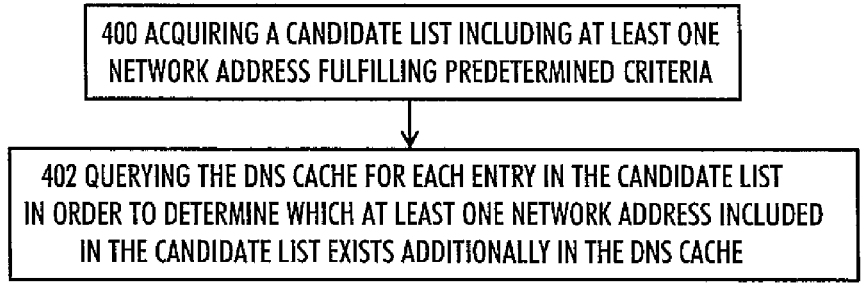
Figure 4B:
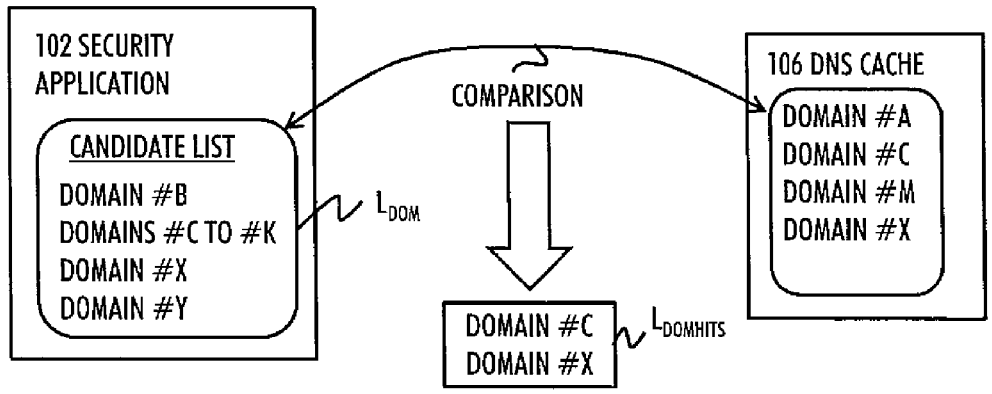
Figure 7C:
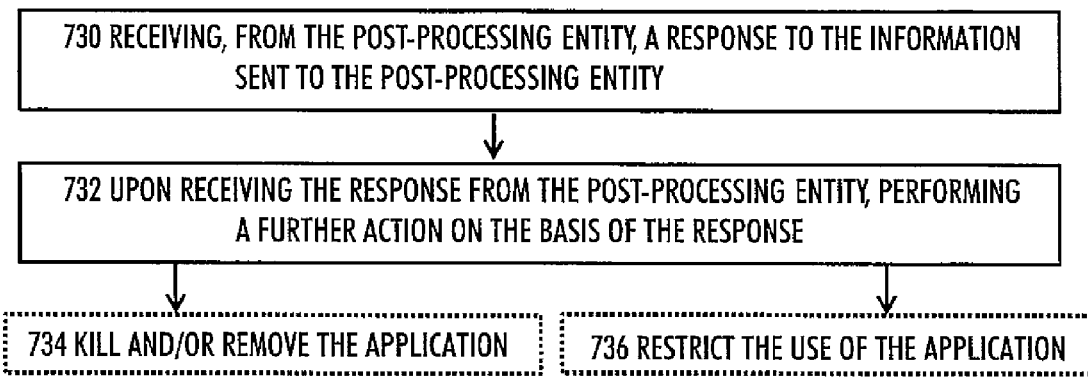
Figure 8:
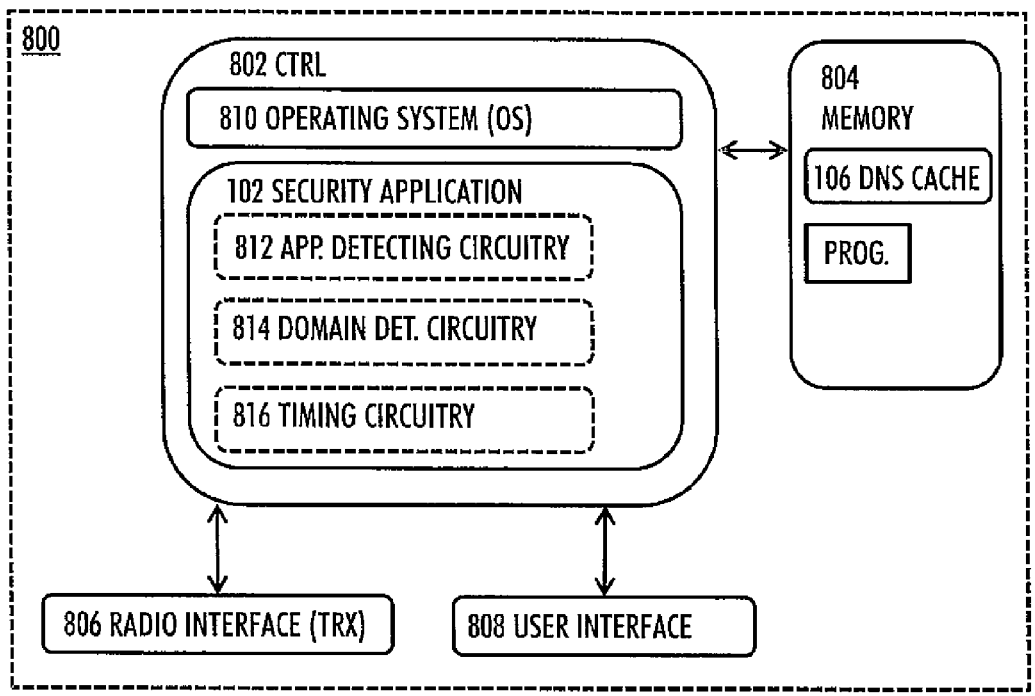
Figure 9:
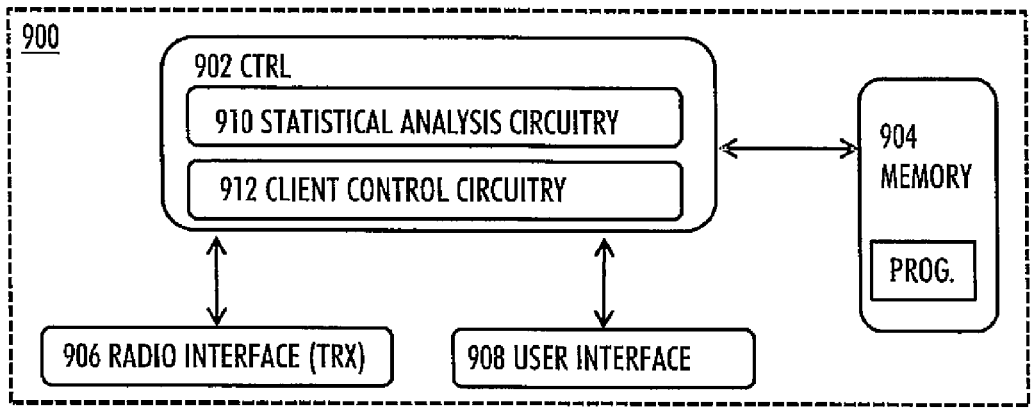

In the following, the invention will be described in greater detail with reference to the embodiments and the accompanying drawings, in which FIG. 1 illustrates a computing environment to which embodiment of the invention may be applied;

FIGS. 2, 3, and 4A show flow diagrams, according to some embodiments;

FIG. 4B illustrates querying a domain name system, DNS, cache, according to an embodiment;

FIGS. 5, 6, 7A and 7C present flow diagrams, according to some embodiments;

FIG. 7B depicts a post-processing entity receiving information from a plurality of clients, according to an embodiment; and FIGS. 8 and 9 illustrate apparatuses according to some embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

FIG. 1 illustrates an example embodiment of the general operation environment to which embodiments of the invention may be applied. The environment may include a personal computing device, e.g. a client's apparatus or a processing device, 100 communicating over a network 120 with at least one server 140, 142.

The processing device 100 may be any electronic apparatus capable of downloading and possibly uploading data over the network 120. A non-exhaustive list of the types of the processing device 100 includes: an electronic digital computer, a desktop computer, a portable computer, a laptop computer, a tablet computer, a smartphone, a mobile phone, a user terminal, a user equipment, a cellular phone, or any other electronic apparatus requiring download control. The client's apparatus 100 may employ an operating system such as Android®, Microsoft® Windows®, Microsoft® Windows Phone®, Apple® iOS®, Apple® Mac OS® X, Berkeley Software Distribution (BSD), Google Chrome, MeeGo®, Blackberry® OS, Linux®, Unix® or Symbian®, for example. The processing device 100 may comprise at least one processor and at least one memory storing a computer program code controlling the operation of the at least one processor.

The network 120 may include various wired/wireless standard/non-standard/proprietary communication networks such as a computer network, a private network, an IP-based network (TCP/IP=Transmission Control Protocol/Internet Protocol), the Internet, the telephone network including the public switched telephone network, any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11ac etc.), WiMAX (Worldwide Interoperability for Microwave Access, or Wi-Fi, for example. The user may apply the personal computing device 100 in accessing the servers 140, 142 connected the network 120, for example.

The servers 140, 142 may be a part of the client-server computing model that acts as distributed application which partitions tasks or workloads between the provider of a resource or service, called the server 140, 142, and the service requester, called the client 100. The server computer 140, 142 is a host that is running one or more server programs which share their resources with the personal computing devices 100. The processing device 100 may request a server's content or service function. The client may thus initiate a communication session with the server 140, 142 which awaits incoming requests.

A use of the processing device 100 over the network 120, such as surfing the World Wide Web or Internet, may be hazardous as criminals have infested the network 120 by malicious software (malware) including computer viruses, worms, Trojan horses, spyware, adware, rootkits, ransom ware and other malicious programs. Therefore, the client's processing device 100 may comprise a security (software) application 102 connected to an operating system (OS) of the personal computing device 100. The security software application 102 may comprise antivirus software, a firewall, a network traffic monitoring, etc. that monitor the operation of the personal computing system and attempt to detect any viruses or malicious software (malware) attempting to exploit vulnerabilities and/or cause harm in the personal computing device 100 and in communication protocols used for accessing the computer networks 120. The security software application 102 may be connected to a security server 140 at least intermittently to check for the latest virus, worm, and malware definitions and configurations. That is, the security server 140 may comprise such security information which the processing device 100 may download and in that way update its security software application 102. The security software application may be a self-sustained application able to detect and quarantine, any viruses, attack vectors, and malware autonomously, or it may contact the security server for instructions or virus/malware definitions upon detecting suspicious content or a possible attack.

The domain name server 142 associates various pieces of information with domain names assigned to each of the participating entities. The DNS server 142 resolves queries for these names into internet protocol (IP) addresses, such as into IPv4 or into IPv6 addresses, for the purposes of locating computer services and devices worldwide. Thus, it translates human-friendly computer hostnames, such as www.example-.com, into IP addresses. In other words, there are two different name spaces used: the domain name hierarchy space and the IP address space. The DNS server/service 142 maintains the domain name hierarchy space and provides translation services between the domain name hierarchy space and the IP address spaces.

The client's device 100 may comprise a DNS resolver 104 for initializing and causing the transmission of the translation query to the DNS server 142, which may be of recursive nature. However, it may be advantageous to keep a DNS cache 106 accessible by the client's device 100. This is because accessing the DNS server 142 over the network 120 each time certain domain name needs to be resolved into an IP address may take some time. To improve efficiency, reduce DNS traffic across the network 120, and increase performance in end-user applications, the DNS may support DNS caching in which DNS query results for a certain period of time are stored in the DNS cache 106. For example, when the client wants to access a certain domain, which has been recently queried and thus existing in the DNS cache 106, the translation may be obtained from the DNS cache 106 instead of the DNS server 142. Thus, the network 120 need not necessarily be used for acquiring the corresponding translation. The DNS cache 106 may locate in the client's device 100 and/or the Internet service provider may provide caching name servers for their customers.

An internet protocol (IP) routing information 110, such as a routing table or routing information base, may be stored and may comprise information listing the routes to particular network destinations/addresses/domains.

As said, detecting malicious applications by monitoring their behavior has proven to be very effective. For example, monitoring operations, like file creation and network connectivity, may be used to detect that an application belongs to a certain family of malware much more effectively than looking at the application in a static way (e.g. analyzing its code and data). For example, on the Windows OS, documented "callback" functions provided by the OS may be utilized. The callback functions may allow visibility to the behavior of any application running on the system, including file system operations, registry operations and so on. The applications may also install undocumented "hooks" into the kernel of the OS or to the user-space memory of processes to monitor the behavior of the applications.

However, on many modern platforms, such as on many mobile platforms, the security model does not allow an application to monitor the behavior of other applications. For example, these modern platforms include operating systems like Android and iOS. Therefore, a proposal, which enables the monitoring of at least certain behavior of some applications even on restricted platforms (where monitoring the applications directly is impossible because of restrictions of the platform itself) is needed. For example, in such restricted platforms no direct "callback" functions may be available and the security model may prevent the installation of "hooks".

FIG. 2 illustrates an embodiment of a method performed by the security application 102 in order to at least enable the application behavior monitoring. The security application 102 may be defined by a computer program code stored in a memory unit of the processing device 100 and it may configure at least one processor of the processing device 100 to perform the at least the following steps. In step 200, security or monitoring application 102 (e.g. a security routine) may generate an application list $L_{app}$ including one or more applications which are currently running in the processing device 100. These applications may be any known computer program applications including, for example, social media applications, the computer security applications, game and/or utility applications, office applications, professional applications related to any professional field, a web browser, etc. It should be noted that not all applications 108 present in the processing device 100 are currently running in the device 100.

Let's take a look at FIG. 3 in which the acquisition of such application list $L_{app}$ is shown in more detail. In step 300, the security application checks whether the operating system (OS) of the processing device 100 allows the currently running applications to be queried directly or not. If the answer is positive, then the method proceeds in step 302 in which the security application 102 requests the OS applied by the processing device 100 to indicate which one or more applications 108 are currently running. Consequently, the security application 102 may receive an indication on which one or more applications 108 are currently running from the OS in step 304. Based on this information, the $L_{app}$ may be generated and saved. This may be an efficient way to acquire knowledge of the currently running applications.

However if the OS does not share information regarding the currently running applications, the method proceed to step 306 in which the security application 102 determines which at least one application 108 has been installed in the processing device 100. Such information may be obtained by querying the OS, for example. That is, even is the OS does not allow the currently running applications to be queried, it may provide an indication of the installed applications. Thereafter, the installed at least one application 108 may be saved and considered as the currently running one or more applications $L_{APP}$ in step 308. This may provide an efficient way of obtaining an all-inclusive list $L_{app}$ of applications 108 which may be run in the device 100.

Let us take another look at FIG. 2. In step 202, the security application 102 may identify at least one network address/domain fulfilling predetermined criteria. From now on the terms "network address" and "domain" are used interchangeably. The predetermined criteria may in an embodiment comprise at least one of the following: the network address is known to be malicious, the network address is known to provide advertisements, the network address is related to social networking, the network address belongs to a set of predetermined network addresses. Such network address may also be part of autonomous system (AS) that is strongly associated with malware or other questionable activities like spam (based on reputation information, for example). A malware domain may not be the only domain which is of interest. In addition or instead, domains comprising inappropriate content, such as criminal, violent, religiously or politically inappropriate content, and/or adult nature, may be of interest in the sense that applications making connections to such domains may be discovered, as will be described later. In practise, the predetermined criteria may be used to define a set of predetermined network address, such as any list of domains that are to be used in categorizing applications and application behaviour. E.g. if there is need to find all social networking applications, the list of network addresses may include social networking domains (e.g. twitter.com, facebook.com).

Thus, the network addresses fulfilling the predetermined criteria may include a list of malicious network addresses or any network addresses of interest, e.g. ad-serving domains in case applications which show ads are of interest. In an embodiment, the number of network addresses may be in the order of hundreds or thousands. Let us in the following refer to such list of candidate network addresses/domains as $L_{dom}$. In an embodiment, the security application 102 may receive the candidate list $L_{dom}$ including the at least one network address fulfilling the predetermined criteria from the security server 142, for example. In another embodiment, the security application 102 may itself identify the questionable network addresses.

In step 204, the security application 102 may determine which of the at least one network address fulfilling the predetermined criteria has been connected to by the processing device 100 within a predefined time period. Connection may mean that the network domain fulfilling the predetermined criteria has been resolved and connected to by the device 100. It may be of importance to detect only those network addresses which have been connected to (e.g. resolved) by the processing device 100 within the predetermined time period. This may be because, as will be explained later, the information of resolved domains may be used together with the list of currently running applications $L_{app}$. Therefore, connections performed a long time ago may not be relevant with respect to the currently running $L_{app}$. The predetermined time period may be a certain time period from the present point of time to the past. The time period may be empirically derived, for example.

It should be noted that the processing device 100 may operate on a restricted platform which does not support hooking of certain networking application programming interfaces (APIs). In an embodiment, the determination of which of the at least one network address fulfilling the predetermined criteria has been recently connected to may be based on the information included in the local system-wide DNS cache 106. In this case, the predetermined time period may be based on system requirements, such as the time-to-live (TTL) of the DNS cache 106. However, before going deeper in to this embodiment, let us look at FIG. 2 further.

In step 206, the security application 102 may provide a post-processing entity with the application list $L_{app}$ and an indication on which of the at least one network address fulfilling the predetermined criteria has been connected to by the processing device 100 within the predefined time period. In an embodiment, the post-processing entity may be a server, such as the security server 140, or an application running in such server. In yet another embodiment, the post-processing entity may be the client's processing device 100 or an application running in the device 100. The post-processing entity may determine which of the one or more applications in the application list $L_{app}$ have made connections to which of the at least one network address fulfilling the predetermined criteria.

It should be noted that the processing device 100 may operate on a restricted platform which does not allow applications be monitored directly. Thus, for example in Android, there may not be any way of directly querying the applications or the OS about the connection establishments by different applications. However, this may be important to know in order to identify which applications connect to non-desired domains. In this way, the provided information may be used in a collaborative statistical analysis on a monitoring backend (e.g. on the server 142), where information from many clients is received and processed statistically, as will be descried later.

The proposed solution may include monitoring the local system-wide caches of the OS either directly or indirectly in the client's end 100 by the security application/routine 102. Let us next describe how to use one specific cache, in particular, the DNS cache 106.

On certain platforms, it may be possible for the security application 102 to directly query if the system-wide DNS cache 106 contains an entry for a certain domain name. In an embodiment this takes place as shown in FIGS. 4A and 4B by the security application 102 acquiring in step 400 the candidate list $L_{DOM}$ including the at least one network address fulfilling the predetermined criteria. Then the security application 102 may determine which of the at least one network address fulfilling the predetermined criteria exists in the DNS cache 106 applied by the processing device. This may take place as shown in step 402 by querying the DNS cache 106 for each entry in the candidate list $L_{DOM}$ in order to determine which of the at least one network address included in the candidate list $L_{DOM}$ exists additionally in the DNS cache 106. In other words, the security monitoring application 102 may use a certain API provided by the platform to query the system-wide DNS cache 106 for all entries in the $L_{DOM}$. Such comparison may provide a list, $L_{DOMHITS}$, including for example malicious domains existing in the DNS cache 106. Then, the list of positive hits (entries found in the DNS cache 106) maybe saved as the $L_{DOMHITS}$. As shown in the example of FIG. 4B, list $L_{DOM}$ may include domains #B, #C to #K, #X, and #Y, whereas the DNS cache 106 may comprise domains #A, #C, #M, and #X. In this case, it may be detected that out of these $L_{DOM}$ only domains #C and #X exist in the DNS cache 106. That is, only these two have been resolved within the TTL of the DNS cache 106. Thus, the $L_{DOMHITS}$ may comprise only these two domains. Utilizing the DNS cache 106 may be advantageous as the DNS cache 106 is local, which denotes that no information from external sources, such as passive DNS records combined with records from temporal routing table, need to be used. The DNS cache 106 may also be accessed without rooting/jail breaking/modifying the given operation environment in order to accomplish given task.

Figure 5:
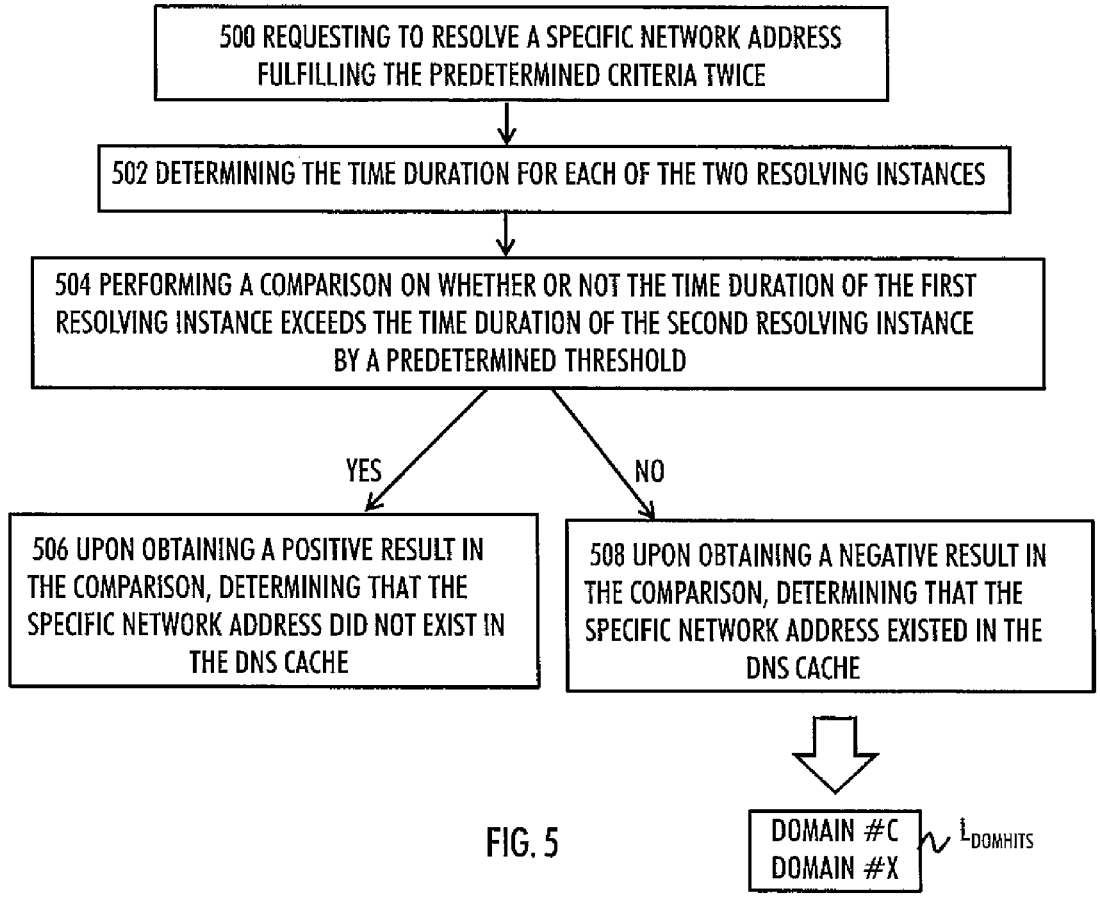

However, in many other platforms, the system-wide DNS cache 106 may not be directly queried due to platform/OS restrictions. Therefore, the above solution for determining if an entry exists in the cache 106 may not be possible. Therefore, in an embodiment, the security application 102 may, as shown in FIG. 5, request to resolve a specific network address fulfilling the predetermined criteria twice in step 500. This may take place by the security monitoring application 102 performing two DNS queries for each network address fulfilling the predetermined criteria. Alternatively, the security application 102 may perform two system calls that result in the specific network address to be resolved twice. It should be noted that the processing device 100 may have acquired the candidate list $L_{DOM}$, as indicated above.

In step 502, the security application determines the time duration for each of the two resolving instances, i.e. for example both of the two DNS queries are timed. Although the above mentions two resolving procedures/instances, in an embodiment, there may be more than two resolving procedures for each network address fulfilling the predetermined criteria. Each time duration/period may comprise the difference between the time instant for placing the query and the time instant of accessing the specific network address, for example.

In step 504, the security application performs a comparison on whether or not the time duration of the first resolving instance exceeds the time duration of the second resolving instance by a predetermined threshold. Performing the query twice may advantageously guarantee that the domain exists in the DNS cache 106 during the second query. I.e. in case the DNS cache 106 did not contain the specific domain before the first query, the DNS cache 106 will comprise the specific domain after the first query. In this manner, the second resolving instance/procedure (e.g. the second DNS cache 106 query for the specific domain) may be considered as the baseline for the timing. It may be noted that the baseline may most likely be unique for each device 100 and for each time instant because it may depend on the platform and the network environment. The predetermined threshold may be needed to account for different network environments, for example. The predetermined threshold may be empirically derived and may depend on the device 100, for example.

Thereafter, if it is determined that the first resolving instance exceeds the time duration of the second resolving instance (i.e. the baseline timing) by the predetermined threshold (i.e. upon obtaining a positive result in the comparison), the method proceeds in step 506. In step 506 it is determined (e.g. assumed) that the specific network address did not exist in the DNS cache 106 before the first resolving instance. That is, the specific network address was not resolved by the processing device 100 before the first query. Then such network address is not added to the $L_{DOMHITS}$.

However, if it is determined that the first resolving instance does not exceed the time duration of the second resolving instance (i.e. the baseline timing) by the predetermined threshold (i.e. upon obtaining a negative result in the comparison), the method proceeds in step 508. In step 508 it is determined that the specific network address did exist in the DNS cache 106 already before the first resolving instance. That is, the specific network address was resolved by the processing device 100 already before the first query. This may indicate that some application running in the device 100 may have caused the connection establishment to the specific domain. The network addresses which are determined to come from the DNS cache 106 (i.e. determined to exist in the DNS cache 106 already before the first query) are saved as $L_{DOMHITS}$.

Figure 6:
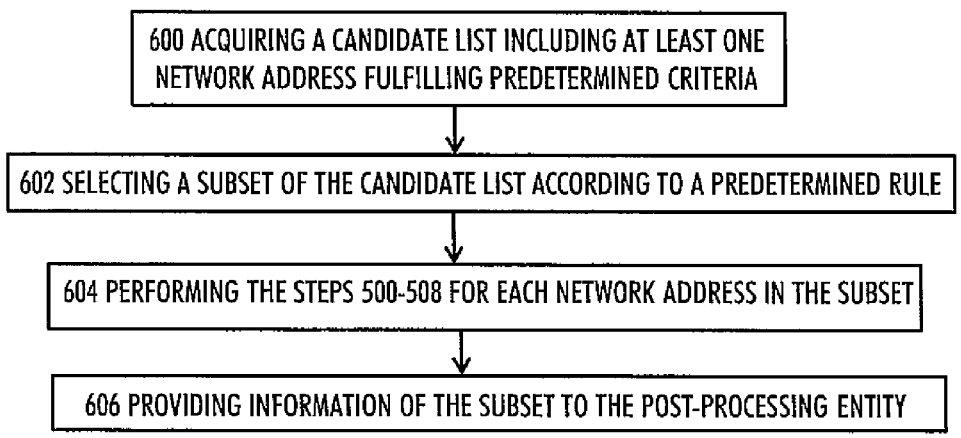

In a further embodiment as shown in FIG. 6, the security application 102 may acquire in step 600 the candidate list $L_{DOM}$ including the at least one network address fulfilling the predetermined criteria. The security application 102 may itself generate such list or it may receive the list from a server, such as the security server 140 or from another processing device, for example.

In step 602, the application 102 may select a subset $L_{DOMSMALL}$ of the candidate list $L_{DOM}$ according to a predetermined rule. In an embodiment, the monitoring application 102 takes a random subset of the acquired $L_{DOM}$, e.g. 10 entries, and saves it as the $L_{DOMSMALL}$. I.e. in this embodiment, the predetermine rule may cause a random selection.

In step 604, the application 102 performs the steps 500 to 508 for each entry (domain/network address) in the subset $L_{DOMSMALL}$. Thus, the application 102 obtains knowledge of entries (domains/network addresses) which exist both in the $L_{DOMSMALL}$ and in the DNS cache 106. The entries assumed to come from the DNS cache 106 may be saved as $L_{DOMSMALLHITS}$, instead of the $L_{DOMHITS}$. It should be noted that the application list $L_{DOM}$ may comprise hundreds or thousands of entries. Going through all of them by performing two resolving instances/procedures (e.g. queries) would take a lot of time. Thus, it may be advantageous to select only the subset $L_{DOMSMALL}$ and go through only the subset $L_{DOMSMALL}$. Finally, in step 606, the application provides information of the selected subset $L_{DOMSMALL}$ and of the $L_{DOMSMALLHITS}$ to the post-processing entity. The approach of FIG. 6 may require more clients 100 to perform the above steps compared to the case of FIGS. 4A, 4B. This may be because each client 100 is only looking at a subset $L_{DOMSMALL}$ of the list of interesting domains/network addresses $L_{DOM}$. The security application 102 may perform the above mentioned DNS cache 106 lookups for any entries in $L_{DOMSMALL}$ that will be visible to the network. It may be noted that when many processing devices send the $L_{DOMSMALL}$, the post-processing entity 710 may aggregate these reports. Such information may be used to approximate the situation where clients can directly query the cache and send information about $L_{DOM}$.

In yet a further embodiment, the processing device 100 query the internet protocol (IP) routing table 110 of the processing device 100 for each entry in the candidate list $L_{DOM}$ in order to determine which of the at least one network address included in the candidate list $L_{DOM}$ exists additionally in the IP routing table 110. Such information about the IP addresses which the processing device 100 has recently connected to may be obtained at least from the IP routing table 110 of the processing device 100 (shown in FIG. 1). Thus, querying or utilizing the DNS cache is not mandatory.

FIGS. 7A and 7B show functionalities from the point of view of the post-processing entity 710. In an embodiment, as said, the post-processing entity 710 is a server, such as the security server 140. In another embodiment, the post-processing entity 710 may be the processing device 100 or another client's device.

As shown in FIGS. 7A and 7B, the post-processing entity 710, and in particular a security application 712 (i.e. monitoring backend) executed in the post-processing entity 712, receives in step 700a set of information from each of a plurality of other processing devices, wherein each set of information comprises at least the following: the application list $L_{APP}$ including one or more applications which are currently running in the given processing device, and an indication on which at least one network address fulfilling predetermined criteria has been connected to within a predefined time period by the given processing device, i.e. the $L_{DOMHITS}$ or the $L_{DOMSMALLHITS}$. In addition, each set of information may comprise an indication of at least one network address fulfilling the predetermined criteria which have been considered by the given processing device. That is, the monitoring backend 712 may additionally receive the list $L_{DOMSMALL}$ comprising the selected subset of the $L_{DOM}$, as explained.

As shown, each client of the plurality of processing devices 100, 720, 722, 724 sends the tuple {$L_{APP}$, $L_{DOMHITS}$} or the tuple {$L_{APP}$, $L_{DOMSMALL}$, $L_{DOMSMALLHITS}$} to the monitoring backend 712. As said, earlier, each of the plurality of processing devices 100, 720, 722, 724 may operate on a restricted platform which does not allow the applications to be monitored directly.

Thereafter, in step 702, the monitoring backend 712 may determine which of the one or more applications in the application list $L_{APP}$ have made connections to which of the at least one network address fulfilling the predetermined criteria (i.e. to domains included in the $L_{DOMHITS}$ or in the $L_{DOMSMALLHITS}$) Such determination may be based on statistical analysis and the received sets of information from each of the plurality of processing devices 100, 720, 722, and 724. The monitoring backend 712 combines the tuples received from all clients 100, 720, 722, and 724 and uses collaborative a statistical analysis to determine which of the applications have made connections to which network addresses. The collaborative statistical analysis may be performed, for example, by using a known technology described in "http://carat.cs.berkeley.edu/". In this cited reference, the statistical analysis is used for the purposes of energy debugging. A person skilled in the art may readily apply the same statistical analysis for the information obtained according to any of the embodiments.

As any known statistical analysis tool may be utilized, the details of the statistical analysis are not explained here. However, as one example, it may be said that the statistical analysis may observe that a certain application is present in many $L_{APP}$:s and similarly a certain (malicious) domain is present in many of the $L_{DOMHITS}$:s from the same processing devices. As a result, it may be determined that this certain application is causing the corresponding processing device to connect to the certain (malicious) domain. The monitoring backend 712 may for example observe, based on the information from many clients 100, 720, 722, and 724, that certain malicious domain has been resolved due to a certain application, which is run in each of the corresponding clients 100, 720, 722, and 724. As a result, the post-processing entity 710 may determine which applications running on the client devices have made connections to which of the domains of interest in the $L_{DOM}$.

As a further example, consider a case where there are two applications, one malicious and one benign. At the start there is no idea which one is the malicious one and which one is the benign. Let us further assume that both of the applications are present in many devices and that these same devices report that a same malicious domain has been connected to by the devices. In order to decide which of the two applications is malicious, one option may be to look for devices that have reported only the benign application and have not reported the malicious domain.

Thereafter, upon detecting that a specific application has connected to a network address fulfilling the predetermined criteria, the post-processing entity 710 may perform one of the following: request the corresponding at least one client 100, 720, 722, and 724 to kill the specific application, request the corresponding at least one client 100, 720, 722, and 724 to remove the specific application, indicate the specific application to the corresponding at least one client 100, 720, 722, and 724, store information indicating the specific application. The latter may be performed silently without indicating the corresponding at least one client 100, 720, 722, and 724. Such storing may be beneficial e.g. if someone needs to verify the results manually. However, how the post-processing entity 710 reacts may depend on the operating system of the processing device 100, and possibly on the settings of the user of the processing device 100.

In an embodiment, as shown in FIG. 7C, the processing device 100 may in step 730 receive, from the post-processing entity, a response to the information sent to the post-processing entity (i.e. the $L_{APP}$ and $L_{DOMHITS}$/$L_{DOMSMALLHITS}$). The response may comprise any of the indications as mentioned above (such as kill/remove). In step 732, the processing device 100 may, upon receiving the response, perform a further action on the basis of the response. In an embodiment, the further action may be to kill and/or to remove the specific application which has connected to a network address fulfilling the predetermined criteria (as shown in step 734), restrict the use/usage of the specific application (as indicated in step 736), etc. Therefore, in an embodiment, the processing device 100 may, in response to acquiring the request from the post-processing entity, for example, kill and/or remove the specific application.

A specific mechanism to detect network connections caused by certain applications has been described above according to some embodiments. However, in some other embodiments, certain other event(s) instead of network connections may be monitored and detected assuming a corresponding suitable data source (e.g. caches) is/are available.

In an embodiment, the post-processing entity 710 may detect which at least one application on the received application list $L_{APP}$ has connected the network 120 within the predetermined time period. The entity 710 may perform such detection by knowing the type and capabilities of different applications, for example. In addition, identifying these applications may be aided by information from the corresponding processing device, such as the device 100. The device 100 may, e.g., request the operating system to indicate which one or more applications have connected the network 120. The device 100 may indicate these to the entity 710, for example.

Thereafter, in an embodiment, upon detecting that a given application on the application list has not connected network 120 within the predetermined time period, then the entity 710 may determine that at least this specific application is not responsible for connecting to the network address fulfilling the predetermined criteria. This may aid in efficiently disregarding those application which for sure have not made connection to the network address fulfilling the predetermined criteria.

In another embodiment, the entity 710 may detect that no application in the application list $L_{APP}$ has connected the network 120 within the predetermined time period. This may cause the entity 710 to determine that there is a malware application having administrative rights running in the corresponding processing device, such as in the device 100. The entity 710 may then indicate the determination result to the corresponding processing device 100 in order to enable the corresponding processing device 100 to perform an operation in the processing device 100 on the basis of the determination result. An example operation may be that the device 100 automatically runs malware or virus detection software to identify the malware application in the device 100. Another example may be that the device 100 displays such indication for the user of the device 100, for example.

FIGS. 8 to 9 provide apparatuses 800 and 900 comprising a control circuitry (CTRL) 802, 902, such as at least one processor, and at least one memory 804, 904 including a computer program code (PROG), wherein the at least one memory 804, 904 and the computer program code (PROG), are configured, with the at least one processor, to cause the respective apparatus 800, 900 to carry out any one of the embodiments described.

The apparatus 800 may be or be comprised in the processing device 100 and comprise the control circuitry 802 for carrying out the functions as described. The control circuitry 802 may be configured to execute the OS 810 of the processing device 100. As said, the operating system 810 may be an arbitrary operating system, e.g. Microsoft® Windows®, Mac OS®, iOS®, Linux®, Unix®, Berkeley Software Distribution (BSD), Google Chrome, Android®, MeeGO®, Symbian®, Blackberry® OS, etc. As known in the art, the operating system 810 manages computer hardware resources, e.g. the processor(s) included in the circuitry 810 and provides services to applications 108 of the processing device 100 executed in the personal computing device 100.

The control circuitry 810 may also execute the security application 102. The security application 102 may run, for example, the application detection circuitry 812 for detecting the currently running applications in the processing device 100, a domain or a network address detection circuitry 814 for detecting which domains/network addresses fulfilling the predetermined criteria have been recently resolved (connected to) by the processing device 100, and a timing circuitry 816 for timing the DNS cache 106 queries, according to any of the embodiments.

The apparatus 900 may be or be comprised in the post-processing entity 710 executing the functionalities of the monitoring backend 712. The control circuitry 902 may be configured to execute the statistical analysis based on the information received from a plurality of clients by applying a statistical analysis circuitry 910. The control circuitry 910 may further comprise a client control circuitry 912 for transmitting commands to one or more clients, for example.

The memory 804, 904 may be implemented using any suitable data storage technology, such as semiconductor based memory devices, flash memory, magnetic memory devices and systems, optical memory devices and systems, fixed memory and removable memory.

The apparatuses 800, 900 may further comprise communication interfaces (TRX) 806, 906 comprising hardware and/or software for realizing communication connectivity according to one or more communication protocols. The TRX may provide the apparatus with communication capabilities to access the radio access network, for example. For example, the operating system 810 may configure the communication interface 806 to provide a connection to the computer networks 120, e.g. the Internet. The communication interface 806 under the control of the operating system 810 may be used to access the network servers 140, 142, for example.

The apparatuses 800, 900 may also comprise user interfaces 808, 908 comprising, for example, at least one keypad, a micro-phone, a touch display, a display, a speaker, etc. Each user interface may be used to control the respective apparatus by the user.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
generating, by a security application executed in a processing device, an application list including one or more applications which are currently running in the processing device;
identifying at least one network address fulfilling predetermined criteria;
determining which of the at least one network address fulfilling the predetermined criteria has been connected to by the processing device within a predefined time period;
providing a post-processing entity with the application list and an indication on which of the at least one network address fulfilling the predetermined criteria has been connected to by the processing device within the predefined time period;
receiving, from the post-processing entity, a response comprising instructions related to a specific application included in the application list when the post-processing entity has determined that the specific application has connected to the network address fulfilling the predetermined criteria; and
performing an action with respect to the specific application on the basis of the response, wherein the action is one of killing the specific application, removing the specific application, and restricting the use of the specific application, and
wherein the processing device operates on a restricted platform which does not allow applications to be monitored directly.

2. The method of claim 1, further comprising:
requesting the operating system applied by the processing device to indicate which one or more applications are currently running; and
receiving an indication on which one or more applications are currently running from the operating system.

3. The method of claim 1, further comprising:
determining which at least one application has been installed in the processing device; and
considering the installed at least one application as the currently running one or more applications.

4. The method of claim 1, wherein the predetermined criteria comprise at least one of the following: the network address is known to be malicious, the network address is known to provide advertisements, the network address is related to social networking, the network address belongs to a set of predetermined network addresses.

5. The method of claim 1, further comprising:
acquiring a candidate list including the at least one network address fulfilling the predetermined criteria; and
querying a domain name system, DNS, cache for each entry in the candidate list in order to determine which of the at least one network address included in the candidate list exists additionally in the DNS cache.

6. The method of claim 1, further comprising:
acquiring a candidate list including the at least one network address fulfilling the predetermined criteria; and
querying an interne protocol routing table of the processing device for each entry in the candidate list in order to determine which of the at least one network address included in the candidate list exists additionally in the internet protocol routing table.

7. The method of claim 1, further comprising:
requesting to resolve a specific network address fulfilling the predetermined criteria twice,
determining the time duration for each of the two resolving instances;
performing a comparison on whether or not the time duration of the first resolving instance exceeds the time duration of the second resolving instance by a predetermined threshold;
upon obtaining a positive result in the comparison, determining that the specific network address did not exist in a domain name system cache; and
upon obtaining a negative result in the comparison, determining that the specific network address existed in the domain name system cache.

8. The method of claim 1, further comprising:
acquiring a candidate list including at least one network address fulfilling predetermined criteria;
selecting a subset of the candidate list according to a predetermined rule;
performing for each network address in the subset as follows:
requesting to resolve a specific network address fulfilling the predetermined criteria twice;
determining the time duration for each of the two resolving instances;
performing a comparison on whether or not the time duration of the first resolving instance exceeds the time duration of the second resolving instance by a predetermined threshold;
upon obtaining a positive result in the comparison, determining that the specific network address did not exist in a domain name system cache; and
upon obtaining a negative result in the comparison, determining that the specific network address existed m the domain name system cache; and
providing information of the selected subset to the post-processing entity.

9. The method of claim 1, further comprising:
receiving, from the post-processing entity, a request to kill and/or remove the specific application; and
in response to acquiring the request, killing and/or removing the specific application.

10. A method, comprising:
receiving, by a security application executed in a post-processing entity, a set of information from each of a plurality of processing devices, wherein each set of information comprise at least the following: an application list including one or more applications which are currently running in a given processing device, and an indication on which of at least one network address fulfilling predetermined criteria has been connected to within a predefined time period by the given processing device;
determining which of the one or more applications in the application list have made connections to which of the at least one network address fulfilling the predetermined criteria on the basis of a statistical analysis and the received sets of information from each of the plurality of processing devices; and
responding to each of the plurality of processing devices with instruction relating to a specific application included in the application list when the specific application has been determined to have connected to the network address fulfilling the predetermined criteria, wherein the instructions cause the plurality of processing devices to perform an action with respect to the specific application on the basis of the response, wherein the action is one of killing the specific application, removing the specific application, and restricting the use of the specific application,
wherein each of the plurality of processing devices operates on a restricted platform which does not allow applications to be monitored directly.

11. The method of claim 10, wherein each set of information comprises an indication of at least one network address fulfilling the predetermined criteria which have been considered by the given processing device.

12. The method of claim 10, further comprising:
upon determining that the specific application has connected to a network address fulfilling the predetermined criteria, performing one of the following: request the corresponding at least one client to kill and/or remove the specific application, indicate the specific application to the corresponding at least one client, store information indicating the specific application.

13. An apparatus, comprising:
at least one processor and at least one memory including a computer program code, wherein the at least one memory and the computer program code are configured, with the at least one processor, to cause the apparatus at least to:
execute a security application in a processing device;
generate an application list including one or more applications which are currently running in the processing device;
identify at least one network address fulfilling predetermined criteria;
determine which of the at least one network address fulfilling the predetermined criteria has been connected to by the processing device within a predefined time period;
provide a post-processing entity with the application list and an indication on which of the at least one network address fulfilling the predetermined criteria has been connected to by the processing device within the predefined time period; and
receive, from the post-processing entity, a response comprising instructions related to a specific application included in the application list when the post-processing entity has determined that the specific application has connected to the network address fulfilling the predetermined criteria; and
perform an action with respect to the specific application on the basis of the response, wherein the action is one of killing the specific application, removing the specific application, and restricting the use of the specific application,
wherein the processing device operates on a restricted platform which does not allow applications to be monitored directly.

14. The apparatus of claim 13, wherein the at least one memory and the computer program code are configured, with the at least one processor, to cause the apparatus further to:
request the operating system applied by the processing device to indicate which one or more applications are currently running; and
receive an indication on which one or more applications are currently running from the operating system.

15. The apparatus of claim 14, wherein the at least one memory and the computer program code are configured, with the at least one processor, to cause the apparatus further to:
determine which at least one application has been installed in the processing device; and
consider the installed at least one application as the currently running one or more applications.

16. The apparatus of claim 13, wherein the predetermined criteria comprise at least one of the following: the network address is known to be malicious, the network address is known to provide advertisements, the network address is related to social networking, the network address belongs to a set of predetermined network addresses.

17. The apparatus of claim 13, wherein the at least one memory and the computer program code are configured, with the at least one processor, to cause the apparatus further to:
acquire a candidate list including the at least one network address fulfilling the predetermined criteria; and
query a domain name system, DNS, cache for each entry in the candidate list in order to determine which of the at least one network address included in the candidate list exists additionally in the DNS cache.

18. The apparatus of claim 13, wherein the at least one memory and the computer program code are configured, with the at least one processor, to cause the apparatus further to:
acquire a candidate list including the at least one network address fulfilling the predetermined criteria; and
query an internet protocol routing table of the processing device for each entry in the candidate list in order to determine which of the at least one network address included in the candidate list exists additionally in the internet protocol routing table.

19. The apparatus of claim 13, wherein the at least one memory and the computer program code are configured, with the at least one processor, to cause the apparatus further to:
request to resolve a specific network address fulfilling the predetermined criteria twice;
determine the time duration for each of the two resolving instances;

perform a comparison on whether or not the time duration of the first resolving instance exceeds the time duration of the second resolving instance by a predetermined threshold;

upon obtaining a positive result in the comparison, determine that the specific network address did not exist in a domain name system cache; and upon obtaining a negative result in the comparison, determine that the specific network address existed in the domain name system cache.

20. The apparatus of claim 13, wherein the at least one processor and the at least one memory including the computer program code are configured, with the at least one processor, to cause the apparatus to:

acquire a candidate list including at least one network address fulfilling the predetermined criteria, select a subset of the candidate list according to a predetermined rule;

perform for each network address in the subset as follows:
  request to resolve a specific network address fulfilling the predetermined criteria twice;
  determine the time duration for each of the two resolving instances;
  perform a comparison on whether or not the time duration of the first resolving instance exceeds the time duration of the second resolving instance by a predetermined threshold;
  upon obtaining a positive result in the comparison, determine that the specific network address did not exist in a domain name system cache; and
  upon obtaining a negative result in the comparison, determine that the specific network address existed in the domain name system cache; and provide information of the selected subset to the post-processing entity.

21. The apparatus of claim 13, wherein the at least one memory and the computer program code are configured, with the at least one processor, to cause the apparatus further to:

receive, from the post-processing entity, a request to kill and/or remove the specific application; and in response to acquiring the request, kill and/or remove the specific application.

22. An apparatus, comprising:

at least one processor and at least one memory including a computer program code, wherein the at least one memory and the computer program code are configured, with the at least one processor, to cause the apparatus at least to:

execute a security application executed in a post-processing entity;

receive a set of information from each of a plurality of processing devices, wherein each set of information comprises at least the following: an application list including one or more applications which are currently running in the given processing device, and an indication on which of at least one network address fulfilling predetermined criteria has been connected to within a predefined time period by the given processing device;

determine which of the one or more applications in the application list have made connections to which of the at least one network address fulfilling the predetermined criteria on the basis of a statistical analysis and the received sets of information from each of the plurality of processing devices; and respond to each of the plurality of processing devices with instruction relating to a specific application included in the application list when the specific application has been determined to have connected to the network address fulfilling the predetermined criteria, wherein the instructions cause the plurality of processing devices to perform an action with respect to the specific application on the basis of the response, wherein the action is one of killing the specific application, removing the specific application, and restricting the use of the specific application, wherein each of the plurality of processing devices operates on a restricted platform which does not allow applications to be monitored directly.

23. The apparatus of claim 22, wherein each set of information comprises an indication of at least one network address fulfilling the predetermined criteria which have been considered by the given processing device.

24. The apparatus of claim 22, wherein the at least one memory and the computer program code are configured, with the at least one processor, to cause the apparatus further to:

upon determining that the specific application has connected to a network address fulfilling the predetermined criteria, perform one of the following: request the corresponding at least one client to kill and/or remove the specific application, indicate the specific application to the corresponding at least one client, store information indicating the specific application.

25. A computer program product embodied on a non-transitory distribution medium readable by a computer and comprising program instructions which, when loaded into au apparatus, execute a method comprising:

generating, by a security application executed in a processing device, an application list including one or more applications which are currently running in the processing device;

identifying at least one network address fulfilling predetermined criteria;

determining which of the at least one network address fulfilling the predetermined criteria has been connected to by the processing device within a predefined time period;

providing a post-processing entity with the application list and an indication on which of the at least one network address fulfilling the predetermined criteria has been connected to by the processing device within the predefined time period;

receiving, from the post-processing entity, a response comprising instructions related to a specific application included in the application list when the post-processing entity has determined that the specific application has connected to the network address fulfilling the predetermined criteria; and performing an action with respect to the specific application on the basis of the response, wherein the action is one of killing the specific application, removing the specific application, and restricting the use of the specific application, wherein the processing device operates on a restricted platform which does not allow applications be monitored directly.

* * * * *